(12) United States Patent
Hwang

(10) Patent No.: US 6,791,612 B1
(45) Date of Patent: Sep. 14, 2004

(54) CMOS IMAGE SENSOR HAVING A PIXEL ARRAY IN A WIDER DYNAMIC RANGE

(75) Inventor: Gyu Tae Hwang, Ichon-shi (KR)

(73) Assignee: Hynix Semiconductor Inc. (KR)

( * ) Notice: Subject to any disclaimer, the term of this patent is extended or adjusted under 35 U.S.C. 154(b) by 0 days.

(21) Appl. No.: 09/344,606

(22) Filed: Jun. 25, 1999

(30) Foreign Application Priority Data

Jun. 27, 1998 (KR) ............................................ 98-24576

(51) Int. Cl.[7] ........................ H04N 5/335; H04N 5/217; H01L 29/76
(52) U.S. Cl. ...................... 348/308; 348/241; 348/302; 257/291
(58) Field of Search ................................ 348/241, 308, 348/302; 250/208.1; 257/291, 292, 293, 294

(56) References Cited

U.S. PATENT DOCUMENTS

| | | | |
|---|---|---|---|
| 4,333,111 A | | 6/1982 | Noda et al. |
| 4,809,075 A | | 2/1989 | Akimoto et al. |
| 5,144,447 A | | 9/1992 | Akimoto et al. |
| 5,214,274 A | | 5/1993 | Yang |
| 5,471,515 A | | 11/1995 | Fossum et al. |
| 5,485,204 A | | 1/1996 | Taniji |
| 5,587,596 A | | 12/1996 | Chi et al. |
| 5,654,537 A | | 8/1997 | Prater |
| 5,721,425 A | | 2/1998 | Merrill |
| 5,744,823 A | * | 4/1998 | Harkin et al. .................. 257/68 |
| 5,841,126 A | | 11/1998 | Fossum et al. |
| 5,877,715 A | * | 3/1999 | Gowda et al. .............. 348/308 |
| 5,880,691 A | | 3/1999 | Fossum et al. |
| 5,892,540 A | * | 4/1999 | Kozlowski et al. .......... 348/308 |
| 5,892,541 A | | 4/1999 | Merrill |
| 5,933,188 A | * | 8/1999 | Shinohara et al. ........... 348/302 |
| 6,243,134 B1 | * | 6/2001 | Beiley ......................... 348/308 |
| 6,433,822 B1 | * | 8/2002 | Clark et al. .................. 348/241 |
| 6,441,852 B1 | * | 8/2002 | Levine et al. ............... 348/308 |
| 6,469,740 B1 | * | 10/2002 | Kuroda et al. .............. 348/308 |
| 2001/0006402 A1 | * | 7/2001 | Hosier et al. ............... 348/308 |
| 2001/0010551 A1 | * | 8/2001 | Dierickx ...................... 348/241 |

* cited by examiner

*Primary Examiner*—Wendy R. Garber
*Assistant Examiner*—Lin Ye
(74) *Attorney, Agent, or Firm*—Townsend and Townsend and Crew LLP

(57) ABSTRACT

The present invention relates to a CMOS (Complementary Metal Oxide Semiconductor) image sensor; and, more particularly, to a pixel array of the CMOS image sensor in a wider dynamic range. A CMOS image sensor based on a correlated double sampling comprises a single common node, a plurality of unit pixels in parallel connected to the single common node, an amplifying means coupled to the single common node for amplifying a voltage of the single common node and outputting the amplified voltage, and an output means for receiving the amplified voltage from the amplifying means and outputting a data voltage level and a reset voltage level.

9 Claims, 4 Drawing Sheets

CMOS IMAGE SENSOR HAVING A PIXEL ARRAY IN A WIDER DYNAMIC RANGE

FIELD OF THE INVENTION

The present invention relates to a CMOS (Complementary Metal Oxide Semiconductor) image sensor; and, more particularly, to a pixel array of the CMOS image sensor in a wider dynamic range.

DESCRIPTION OF THE PRIOR ART

Generally, an image sensor is an apparatus to capture images using light sensing semiconductor materials. Since brightness and wavelength of light from an object are different in their amount according to the reflection area, electrical signals from pixels are different from one another. These electrical signals are converted into digital signals, which can be processed in a digital circuit, by an analogue-to-digital converter. Thus, the image sensor needs a pixel array having tens to hundreds of thousands of pixels, a converter for converting analogue voltages into digital voltages, hundreds to thousands of storage devices and so on.

Referring to FIG. 1, a conventional CMOS image sensor includes a control and interface unit 10, a pixel array 20 having a plurality of CMOS image sensing elements, and a single slope AD converter 30. The single slope AD converter 30 also includes a ramp voltage generator 31 for generating a reference voltage, a comparator (operational amplifier) 32 for comparing the ramp voltage with an analogue signal from the pixel array 20 and a double buffer 40.

The control and interface unit 10 controls the CMOS image sensor by controlling an integration time, scan addresses, operation modes, a frame rate, a bank and a clock division and acts as an interface with an external system. The pixel array 20 consisting of N×M unit pixels having excellent light sensitivity senses images from an object. Each pixel in the pixel array 20 includes a transfer transistor, a reset transistor and a select transistor. The single slope AD converter 30 converts analogue signals from the pixel array 20 into digital signals. This AD conversion is carried out by comparing the ramp voltage with the analogue signals. The comparator 32 searches for a point at which the analogue signals are the same as the falling ramp voltage with a predetermined slope. When the ramp voltage is generated and then starts falling, the control and interface unit 10 generates count signals to count the degree of the voltage drop. For example, the ramp voltage starting the voltage drop, the converted digital value may be "20" in the case where the analogue signals are the same as the falling ramp voltage at 20 clocks of the control and interface unit 10. This converted digital value is stored in the double buffer 40 as digital data.

FIG. 2 is a circuit diagram illustrating a conventional unit pixel. Referring to FIG. 2, where the CMOS image sensor is based on the correlated double sampling (hereinafter, referred to as a CDS) for high quality images, a unit pixel 100 in the pixel array includes a photodiode and four transistors. In other words, the unit pixel 100 includes a transfer transistor MT, a reset transistor MR, a drive transistor MD and a select transistor MS. The transfer transistor MT transfers photoelectric charges generated in the photodiode 101 to sensing node D, the reset transistor MR resets sensing node D in order to sense a next signal, the drive transistor MD acts as a source follower and the select transistor MS outputs the digital data to an output terminal in response to the address signals.

In accordance with the CDS, the unit pixel 100 obtains a voltage corresponding to a reset level by turning on the reset transistor MR and turning off the transfer transistor MT. Also, the unit pixel 100 obtains a data level voltage by turning off the transfer transistor MT in a turned-off state of the reset transistor MR and reading out photoelectric charges generated in the photodiode 101. An offset, which is caused by the unit pixel 100 and the comparator 32, may be removed by subtracting the data level from the reset level. This removal of the offset is essential to the CDS. That is, by removing an unexpected voltage in the unit pixel 100, it is possible to obtain a net image data value. At this time, a clock coupling is generated by a parasitic capacitor of the transfer transistor MT, the reset transistor MR and the drive transfer transistor MD according to repetitively turning on and off of the transfer and reset transistors MT and MR.

FIG. 3 shows a timing chart illustrating control signals applied to the transistors of the unit pixel shown in FIG. 2. The operation of the unit pixel 100 will be described with reference to FIG. 3.

1) In section "A", the transfer transistor MT and the reset transistor MR are turned on and the select transistor MS is turned off, so that the photodiode 101 is fully depleted.

2) In section "B", the reset transistor MR keeps on a turned-on state and the transfer transistor MT is turned off so that a reset voltage level is transferred through the reset transistor MR to a sensing node D, and then the select transistor MS is turned on so that the reset voltage level is outputted through the select transistor MS to an output terminal (a reset voltage level).

3) In section "C", the select transistor MS and the transfer transistor MT are turned off and turned on, respectively, thus the unit pixel 100 reads out photoelectric charges generated in the photodiode 101. Then, the select transistor MS is turned on again so that a data voltage level is outputted to the output terminal (a data voltage level).

Here, the drive transistor MD acts as a source follower so that the output signal is determined by the charges, that is, the amount of charges generated in the photodiode 101 and it is outputted to the output terminal while the select transistor MS is turned on. At this moment, the final output of the unit pixel 100 is determined by a biasing signal Bias applied to a load transistor MB. As a result, the biasing signal Bias has an effect on the potential of the sensing node D, that is, the gate-source voltage of the drive transistor MD. Such an effect results in reducing the gate-source voltage, i.e., a dynamic range. Referring again to FIG. 2, the potential of the sensing node D is approximately 2.6V during the reset voltage level (in the above section "A") and approximately 1.7V during the data voltage level (in the above section "B"), so that the CMOS image sensor is in a dynamic range of approximately 0.9V and the CMOS image sensor outputs the data based on the variation of gate-source voltage of source follower. Accordingly, the operation of the unit pixel 100 may apply to that of another unit pixels.

Thus, there is a problem that the variation of voltage in the output terminal is in a narrow range, which deteriorates the quality of picture in the CMOS image sensor.

SUMMARY OF THE INVENTION

It is, therefore, an object of the present invention to provide a CMOS image sensor that is based on CDS and provides a unit pixel array with a wider dynamic range.

In accordance with an aspect of the present invention, there is provided a CDS-based CMOS image sensor, comprising: a) a single common node; b) a plurality of unit pixels in parallel connected to the single common node; c) an amplifying means coupled to the single common node for amplifying a voltage of the single common node and outputting the amplified voltage; d) an output means for receiving the amplified voltage from the amplifying means and outputting a data voltage level and a reset voltage level.

BRIEF DESCRIPTION OF THE DRAWINGS

The above and other objects and features of the present invention will become apparent from the following description of the preferred embodiments given in connection with the accompanying drawings, in which.

DETAILED DESCRIPTION OF THE INVENTION

Hereafter, the present invention will be described in detail with reference to the accompanying drawings.

Figure 4:
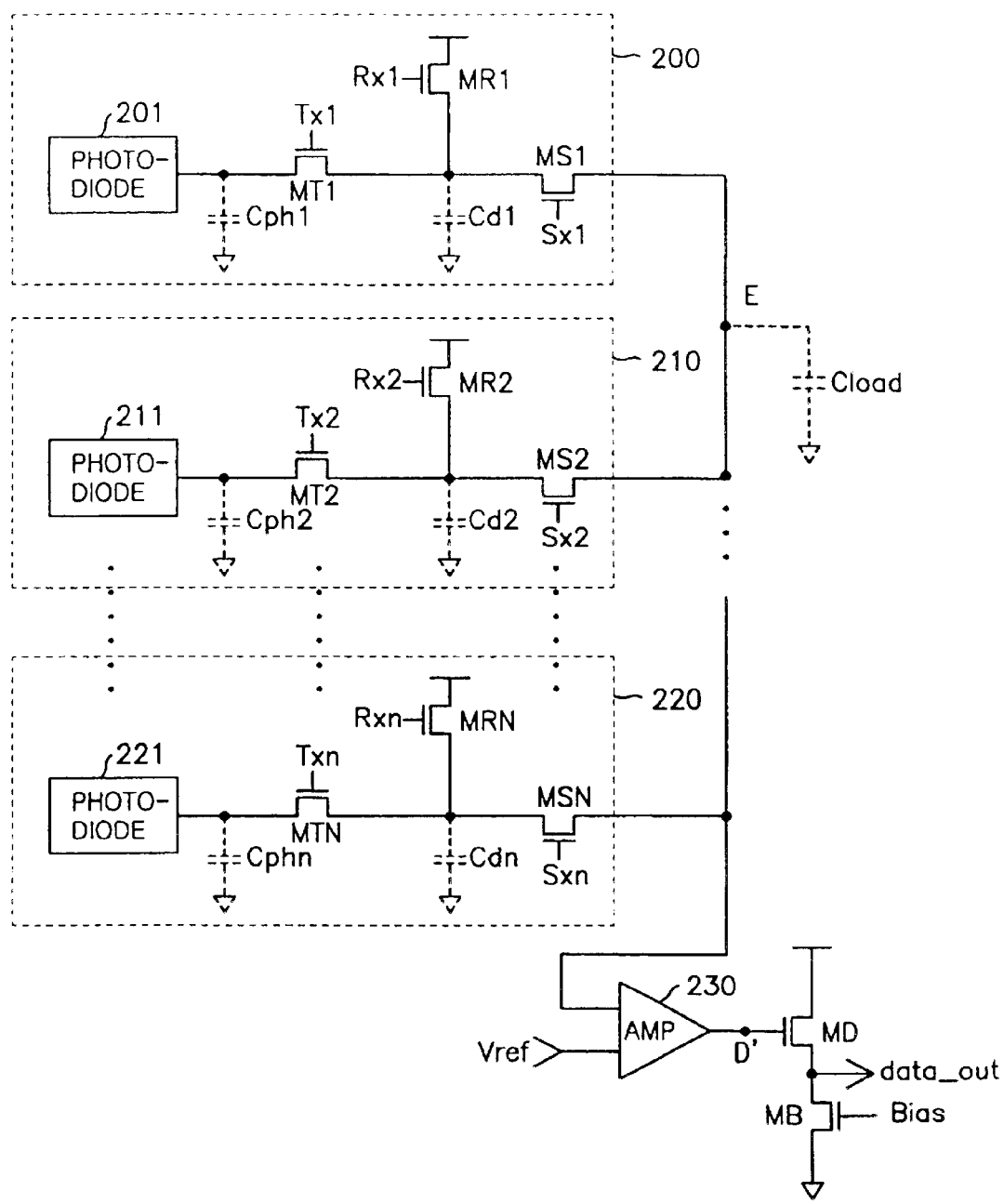
FIG. 4 is a circuit diagram illustrating a pixel array according to the present invention.

Referring to FIG. 4, in a CDS-based CMOS image sensor according to the present invention includes common node E to which output terminals of unit pixels 200, 210 and 220 are connected in parallel. Also, an amplifier 230 is connected to common node E for amplifying an output signal from each of the unit pixels 200, 210 and 220 and an output means for outputting the amplified signal is connected to the output terminal of the amplifier 230. By employing the amplifier, a sufficient dynamic range of the CMOS image sensor is obtained.

Figure 2:
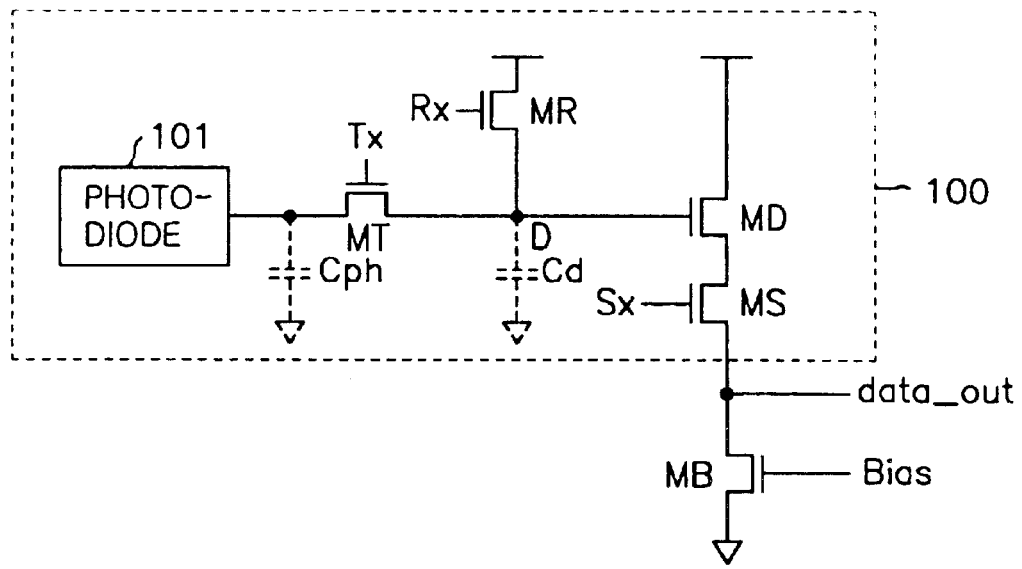
FIG. 2 is a circuit diagram illustrating the unit pixel in FIG. 1.
Figure 3:
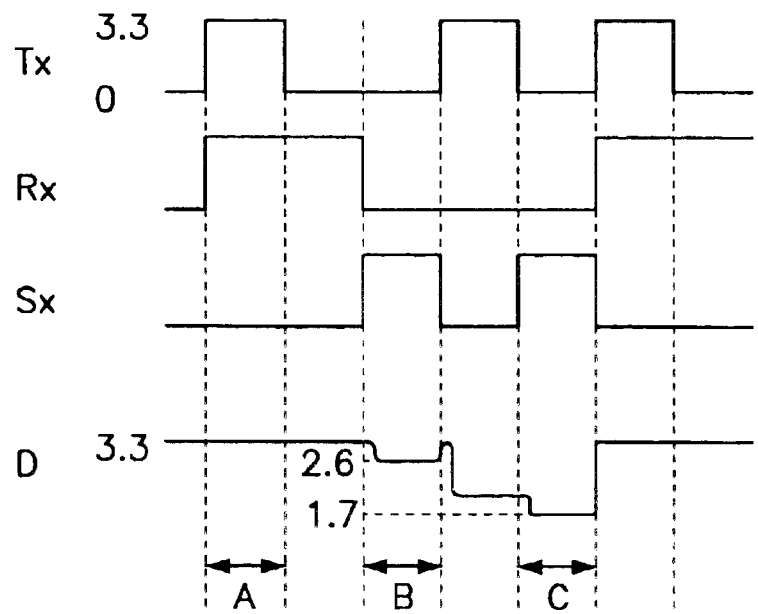
FIG. 3 shows a timing chart illustrating control signals applied to the control transistors in the unit pixel.

Referring again to FIG. 2, after the transfer transistor MT is turned on, the integrated photoelectric charges in photodiode 101 are transferred to a diffusion capacitor $C_d$ (not being actual elements of the unit pixel 100) on the sensing node D. And the output potential of the pixel unit 100 is determined by the transferred amount of the photoelectric charges. And the output potential of the pixel unit 100 is determined by a proportion of an amount of photoelectric charges accumulated in a capacitor $C_{ph}$ (not being actual elements of the unit pixel 100) on the photodiode 101 and the diffusion capacitor $C_d$ on the sensing node D.

Hereinafter, variation of charges integrated in a photodiode and generated by photoelectric charges is referred to as dQ. An equation of dQ is defined by dQ=C*dV, where C is capacitance of the $C_{ph}$ and $C_d$ and dV is the fluctuating potential due to each capacitance.

A method for increasing the dV in order to increase the output of the unit pixel is to decrease the capacitance of the capacitor $C_{ph}$ and the diffusion capacitor $C_d$ and to increase the dQ. However, the method for decreasing the capacitance of the $C_{ph}$ is not available. Meanwhile, there are a method for improving a quantum efficiency by increasing the amount of charges generated by the photoelectric charges in order to increase the dQ and a method for improving a transfer efficiency, that is, transferring the charges through to the transfer transistor MT from the photodiode 101 to the sensing node D (in FIG. 2). Although the above mentioned method may be used, the potential in the sensing node D according to the prior art may have a variation from maximally 2.6V to minimally 1.7V.

Thus, the CMOS image sensor according to the present invention provides the unit pixels with outputs in a wider dynamic range by using the amplifier.

FIG. 4 is a circuit diagram illustrating a pixel array of the CMOS image sensor according to the present invention. Referring, to FIG. 4, the pixel array includes a plurality of unit pixels 200, 210 and 220 connected in parallel to a single common node E, an amplifier 230 couple to single common node E for amplifying the output signals from the unit pixels 200, 210 and 220 and an output means for outputting the amplified signals. The output means includes a drive transistor MD for acting as a source follower in response to the amplified signal from the amplifier 230 and a load transistor MB connected to the drive transistor MD. Each output signal of the unit pixels 200, 210 and 220 is transferred to an external circuit through a common drain terminal data_out between the drive transistor MD and the load transistor MB.

Figure 1:
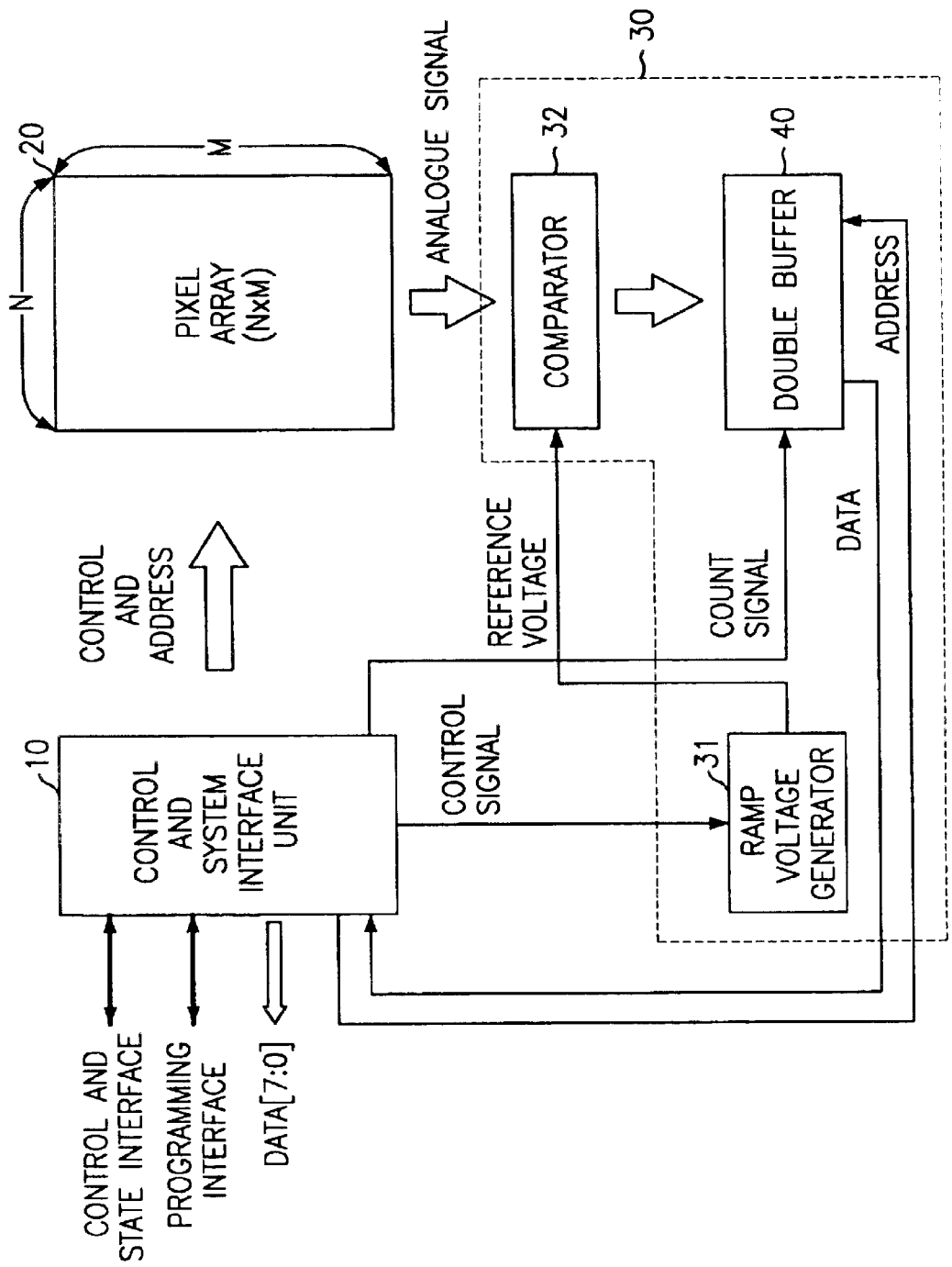
FIG. 1 is a block diagram illustrating a conventional CMOS image sensor.

A potential of a sensing node D' may be defined as $V_{D'}=(C_{ph}*V_{ph})/(C_{ph}+C_t)$ (where, $C_t$ is total value of parasitic capacitance of all unit pixels 200, 210 and 220 and diffusion capacitance of all sensing node and output capacitance of common node E, i.e., $C_t=(C_{ph1}+C_{ph2}+\ldots+C_{phn})+(C_{d1}+C_{d2}+\ldots+C_{dn})+C_{load})$. On the other hand, a potential of the sensing node D in FIG. 1 is defined as $V_D=(C_{ph}*V_{ph})/(C_{ph}+C_p)$ (where, $C_{ph}$ is the sum of parasitic capacitance of the photodiode 101 and diffusion capacitance of the sensing node D, i.e., $C_p=C_{ph}+C_d$). When $V_{D'}$ is divided by $V_D$, $V_{D'}/V_D$ can be written as: $V_{D'}/V_D=(C_{ph}+C_p)/(C_{ph}+C_t)$.

Since $C_{ph}$ is quite small in comparison with $C_t$, the above equation can be written by $V_{D'}/V_D=(C_{ph}+C_p)/C_t$. The amplifier gain of the amplifier 230 may be obtained by multiplying $(C_{ph}+C_{pd})/C_t$ and a desired dynamic range. So, the amplifier 230 should be implemented based on such a gain.

Figure 5:
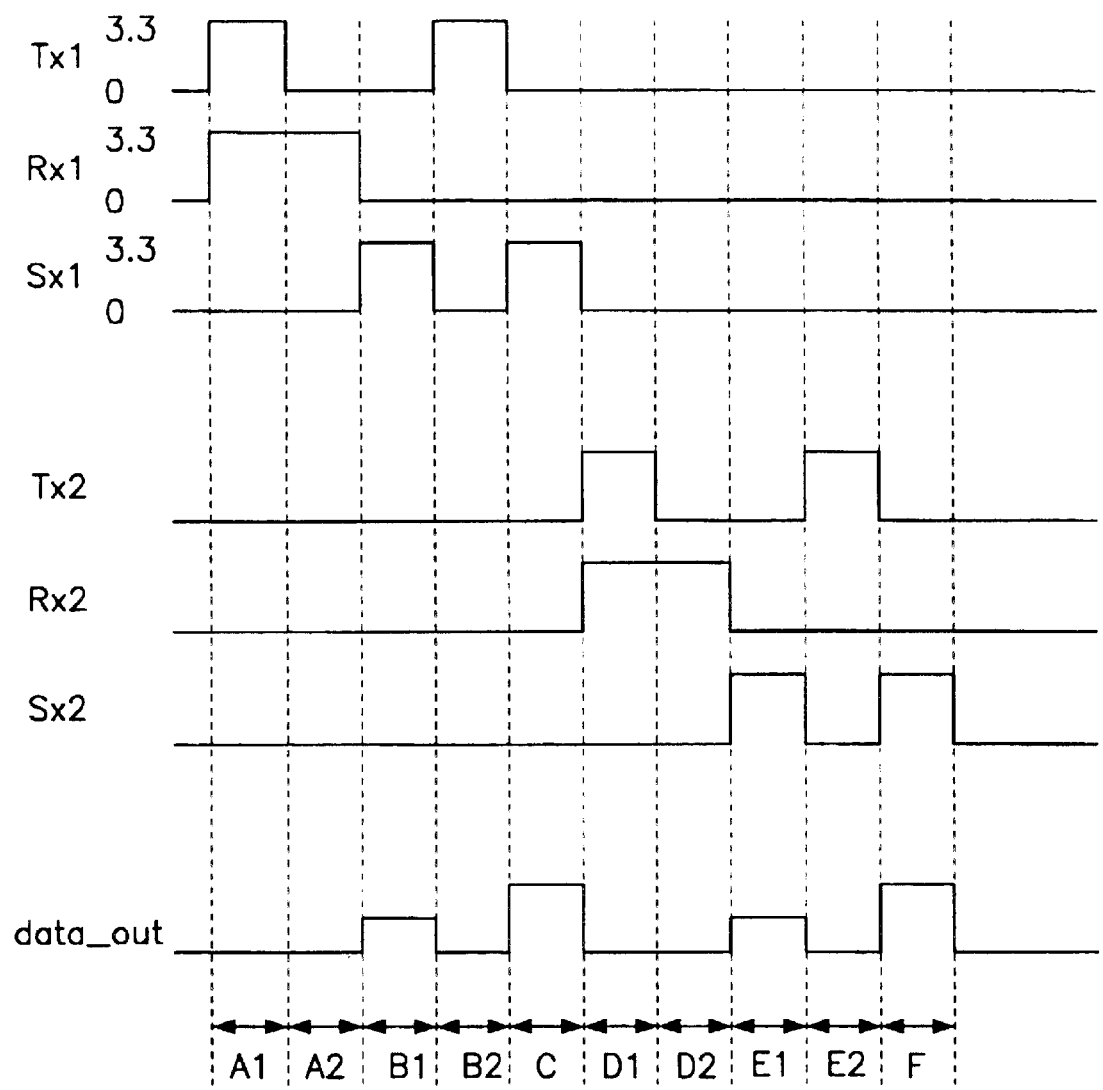
FIG. 5 shows a timing chart illustrating control signals applied to the transistors of the pixel array in FIG. 4.

FIG. 5 is a timing chart illustrating control signals to control transistors of the pixel array shown in FIG. 4.

The operation of the unit pixel 200 in the pixel array will be described in detail with reference to FIGS. 4 and 5.

1) In section "A1" of FIG. 5, the transfer transistor MT1 and the reset transistor MR1 are turned on and the select transistor MS1 is turned off, so that the photodiode 201 is fully depleted 2) In section "A2", the turned-on transfer transistor MT1 is turned off, so that the photodiode 201 generates and integrates photoelectric charges.

3) In section "B1", the turned-on reset transistor MR1 is turned off, the turned-off transfer transistor MT1 keeps on a turned-off state and the turned-off select transistor MS1 is turned on, so that a first reset voltage level is transferred through a single common node E to the amplifier 230 and an amplified reset voltage level from the amplifier 230 is outputted to an output terminal (a reset voltage level).

4) In section "B2", the turned-off reset transistor MS1 keeps on a turned-off state, the turned-on select transistor MS1 is turned off and the turned-off transfer transistor MT1 is again turned on, so that the photoelectric charges generated in section "A2" to "B1" are read out.

5) In section "C", the turned-off reset transistor MR1 keeps on a turned-off state, the turned-on transfer transistor MT1 is turned off and the turned-off select transistor MS1 is turned on, so that a data voltage level corresponding to the photoelectric charges in the photodiode 201 is transferred through the single common node E to the amplifier 230 and an amplified data voltage level from the amplifier 230 is outputted to the output terminal. (a data voltage level)

In similar, reset and data voltage levels of the unit pixel 210 are amplified by the amplifier 230 through the single common node E.

Here, the above reset and the data voltage levels transferred an external circuit through the output means can be adjusted according to the gain of the amplifier 230.

According to the above-mentioned operation, each select transistors MS1, MS2 to MSN connected in parallel on the single common node E is sequentially turned on in response to select signals Sx1, Sx2 to Sxn, and thus each reset and data voltage level is outputted to the external circuit through the output means.

Although the load capacitance $C_{load}$ is very large in the pixel array according to the present invention, the load capacitance of the Cload can be reduced by the gain of the amplifier 230. Also, in case where a predetermined reference voltage is applied to an input terminal of the amplifier 230, the CMOS image sensor has a desired dynamic range and also has the output signals based on the desired dynamic range.

While the present invention has been described with respect to certain preferred embodiments only, other modifications and variations may be made without departing from the spirit and scope of the present invention as set forth in the following claims.

What is claimed is:

1. A CMOS image sensor based on a correlated double sampling, the CMOS image sensor comprising:
   a) a single common node;
   b) a plurality of unit pixels in parallel connected to the single common node;
   c) an amplifying component coupled to the single common node for amplifying a voltage of the single common node and outputting the amplified voltage;
   d) an output component for receiving the amplified voltage from the amplifying component and outputting a data voltage level and a reset voltage level,
   wherein the unit pixel includes:
      a generating component for receiving light from an object and for generating and integrating photoelectric charges,
      a transfer component for transferring the photoelectric charges generated in the generating component to a first node,
      a reset component for resetting the first node, and
      an addressing component for receiving address signals from an external controller,
   wherein a gain of the amplifying component is given by $$GA=(C_{ph}+C_p)*D/C_t$$

where GA is the gain of the amplifying component, D is a desired dynamic range, $C_{ph}$ is a capacitance generated in the generating component, $C_p$ is a sum of parasitic capacitance of the generating component and diffusion capacitance, and $C_t$ is a total value of parasitic capacitance of all unit pixels and diffusion capacitance and output capacitance of the single common node.

2. The CMOS image sensor as recited in claim 1, wherein the generating component is a photodiode.

3. The CMOS image sensor as recited in claim 1, wherein the transfer component is a NMOS transistor.

4. The CMOS image sensor as recited in claim 1, wherein the reset component is a NMOS transistor.

5. The CMOS image sensor as recited in claim 1, wherein the generating component is a photodiode, the transfer component is a transfer transistor, the reset component is a reset transistor, the addressing component is a select transistor,
   wherein a first terminal of the transfer transistor is coupled to the photodiode to receive an output from the photodiode and transmit the output to the select transistor via a second terminal of transfer transistor, a first terminal of the select transistor being coupled to the second terminal of the transfer transistor to receive the output from the photodiode, a second terminal of the select transistor being coupled to the common node,
   wherein a first terminal of the reset transistor is coupled to a node between the second terminal of the transfer transistor and the first terminal of the select transistor.

6. The CMOS image sensor as recited in claim 1, wherein the select transistor is the addressing component, wherein each addressing component of the plurality of unit pixels is connected to the single common node.

7. The CMOS image sensor as recited in claim 1, wherein the output component includes:
   a source follower component for outputting the output of the unit pixel in response to the amplified signal from the amplifying component;
   a biasing component for performing a biasing operation of the source follower in response to a biasing signal.

8. The CMOS image sensor as recited in claim 7, wherein the source follower means is a NMOS transistor connected between a power supply voltage and an common output terminal of the CMOS image sensor.

9. The CMOS image sensor as recited in claim 7, wherein the biasing component is a NMOS transistor connected between the common output terminal and a ground level voltage.

* * * * *